US012811432B2

(12) United States Patent
Huang et al.

(10) Patent No.: US 12,811,432 B2
(45) **Date of Patent: *Nov. 24, 2026**

(54) REDUNDANT SYSTEM AND METHOD FOR PROVIDING POWER TO DEVICES

(71) Applicant: Taiwan Semiconductor Manufacturing Co., Ltd., Hsinchu (TW)

(72) Inventors: Hui-Huan Huang, Hsinchu (TW); Chia-Lun Chen, Hsinchu (TW); Ming-Sung Hung, Hsinchu (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 191 days.

This patent is subject to a terminal disclaimer.

(21) Appl. No.: 18/789,586

(22) Filed: Jul. 30, 2024

(65) Prior Publication Data

US 2024/0388124 A1 Nov. 21, 2024

Related U.S. Application Data

(63) Continuation of application No. 17/076,539, filed on Oct. 21, 2020, now Pat. No. 12,088,141.

(60) Provisional application No. 62/951,965, filed on Dec. 20, 2019.

(51) Int. Cl.

| | |
|---|---|
| ***H02J 9/06*** | (2006.01) |
| ***G06F 1/26*** | (2006.01) |
| ***G06F 1/28*** | (2006.01) |

(52) U.S. Cl.
CPC .............. *H02J 9/061* (2013.01); *G06F 1/263* (2013.01); *G06F 1/28* (2013.01)

(58) Field of Classification Search
CPC ............. H02J 9/061; G06F 1/263; G06F 1/28
See application file for complete search history.

(56) References Cited

U.S. PATENT DOCUMENTS

| | | | | |
|---|---|---|---|---|
| 10,170,925 | B2 | 1/2019 | Cheng et al. | |
| 10,455,722 | B1 | 10/2019 | Wildstone et al. | |
| 10,608,466 | B1 | 3/2020 | Wildstone | |
| 10,855,197 | B2 | 12/2020 | Chang | |
| 12,088,141 | B2 * | 9/2024 | Huang | G06F 1/30 |
| 2003/0029859 | A1 | 2/2003 | Knoot et al. | |
| 2007/0085420 | A1 | 4/2007 | Hartung et al. | |

(Continued)

FOREIGN PATENT DOCUMENTS

| | | |
|---|---|---|
| CN | 201113550 Y | 9/2008 |
| CN | 102004536 A | 4/2011 |

(Continued)

*Primary Examiner* — Harry R Behm
(74) *Attorney, Agent, or Firm* — Seed IP Law Group

(57) ABSTRACT

The present disclosure provides a system and method for providing uninterrupted power to an external device. The system and method include a power supply module coupled to an AC power source and to an external device via a power line, a switching module coupled to the power line, a redundant power supply unit coupled to the AC power source and to the switching module. The switching module is configured to detect an electrical state of the power line and connect the redundant power supply unit to the power line for providing redundant power to the external device based upon the detected electrical state.

20 Claims, 3 Drawing Sheets

(56) References Cited

U.S. PATENT DOCUMENTS

| | | | |
|---|---|---|---|
| 2011/0148204 | A1 | 6/2011 | DiMarco et al. |
| 2014/0277802 | A1 | 9/2014 | Tomas et al. |
| 2015/0232353 | A1 | 8/2015 | Denvir et al. |
| 2015/0256025 | A1 | 9/2015 | Brhlik et al. |
| 2015/0380930 | A1 | 12/2015 | Smith |
| 2016/0218558 | A1 | 7/2016 | Qin et al. |
| 2017/0154745 | A1 | 6/2017 | Hamilton |
| 2018/0090984 | A1 | 3/2018 | Ku et al. |
| 2018/0222334 | A1 | 8/2018 | Compton et al. |
| 2020/0042062 | A1 | 2/2020 | Astefanous et al. |
| 2020/0127490 | A1* | 4/2020 | Muzzey ................ G06F 3/1446 |

FOREIGN PATENT DOCUMENTS

| | | | |
|---|---|---|---|
| CN | 104868507 | A | 8/2015 |
| CN | 105992476 | A | 10/2016 |
| CN | 206673691 | U | 11/2017 |
| CN | 108089687 | A | 5/2018 |
| CN | 108110887 | A | 6/2018 |
| CN | 207677503 | U | 7/2018 |
| CN | 108400633 | A | 8/2018 |
| CN | 108418299 | A | 8/2018 |
| CN | 208093978 | U | 11/2018 |
| CN | 109494802 | A | 3/2019 |
| CN | 110797957 | A | 2/2020 |
| CN | 111404399 | A | 7/2020 |
| CN | 112896195 | A | 6/2021 |
| TW | I385896 | B | 2/2013 |
| TW | 201436402 | A | 9/2014 |
| TW | 201715334 | A | 5/2017 |
| TW | M554661 | U | 1/2018 |
| TW | 201838282 | A | 10/2018 |
| WO | WO 2005071885 | A1 | 8/2005 |
| WO | WO 2018187218 | A1 | 10/2018 |

* cited by examiner

REDUNDANT SYSTEM AND METHOD FOR PROVIDING POWER TO DEVICES

BACKGROUND

Semiconductor fabrication facilities use a variety of devices and systems for processing semiconductor wafers in the fabrication of integrated circuits. Integrated circuit (IC) fabrication includes multiple processing procedures, performed by a variety of powered processing devices, which include etching, deposition, ion implantation, doping, bonding, etc., and in general forming insulating structures, conducting structures, trenches, vias, metal lines and components of passive and active electrical circuits, such as capacitors, resistors, inductors, transistors and antennas, on the semiconductor wafers.

Many of the processing devices use DC power. Since batches of wafers are typically processed under time-critical constraints using costly processing procedures, it is important that disruptions to the production process are minimized.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
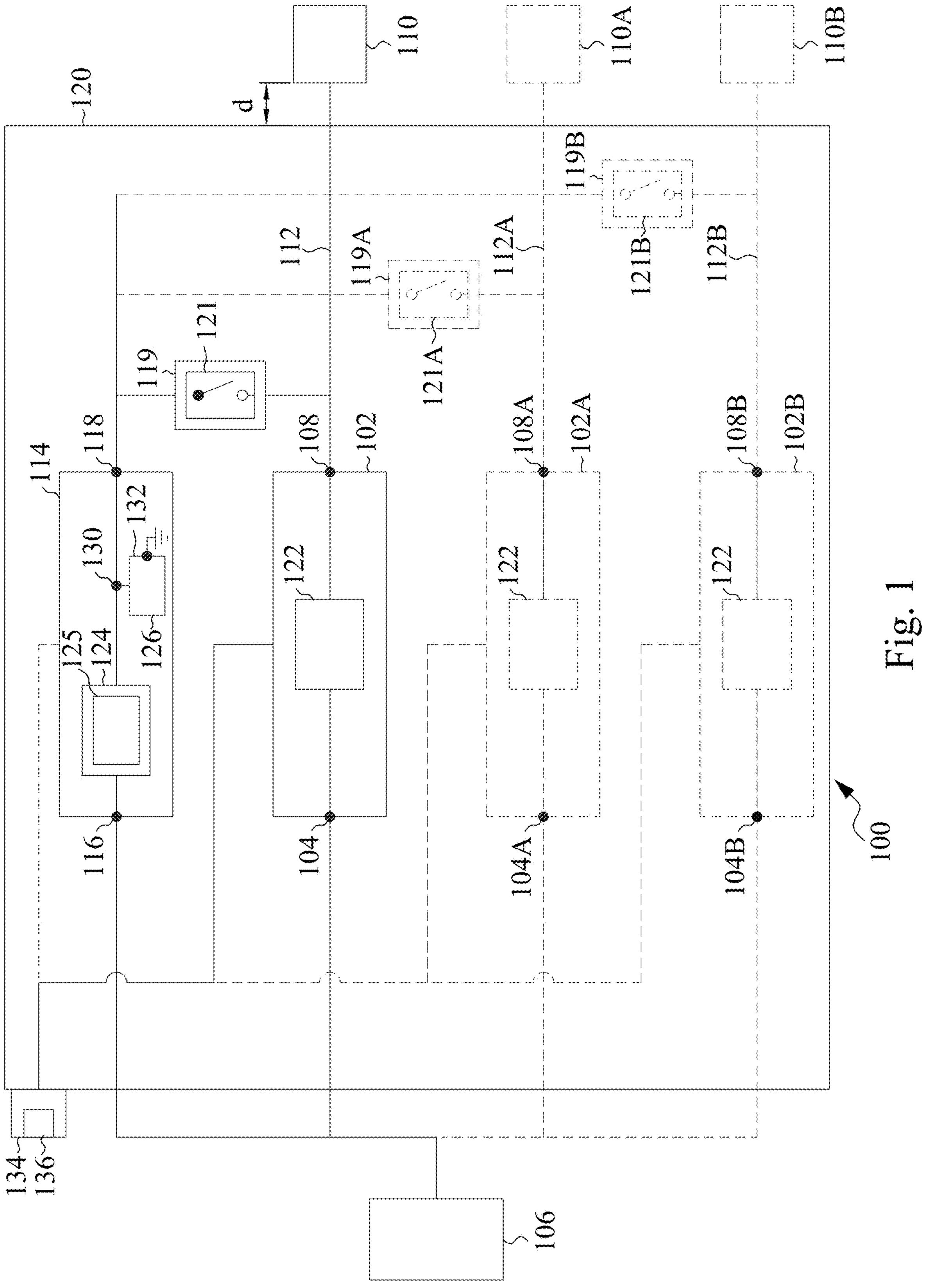
FIG. 1 illustrates a power supply system, according to an embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Wafers are often processed in batches, called lots. Dependent upon the processing procedure, the wafers may be processed in tanks or chambers, such as plasma processing chambers, chemical vapor deposition chambers, physical vapor deposition chambers, ion implantation chambers and photolithographic chambers. Wafers may also be cleaned, etched and rinsed in tanks or chambers. The processing chambers, tanks and other processing/containment systems, as well as other associated components, such as wafer transport/transfer systems and automated systems or devices such as robotic apparatuses, are typically powered by DC sources.

Typically, these powered components of the processing system have integrated DC power sources or integrated AC/DC conversion systems, and/or power systems that are combined with other control circuitry for controlling the integrated power systems and/or controlling the powered components during wafer processing. Due at least to the integration of DC power systems or AC/DC conversion systems with powered processing components and/or the integration with control systems, the DC power systems of conventional DC powered devices are susceptible of overheating, resulting in power failures or power inconsistencies, such as power spikes, thereby leading to disruption of production or production of substandard products. It would be advantageous to provide a system and method for addressing these concerns.

FIG. 1 illustrates a power supply system 100 according to an embodiment of the present disclosure. In the illustrated embodiment, the power supply system 100 includes a power supply module 102 having a first input 104 coupled to an AC power source 106 and a first output 108 coupled to an external device 110 via a power line 112. In accordance with some embodiments of the present disclosure, AC power source 106 is a power transformer for the external device 110. The power supply module 102 is configured to provide power to the external device 110 via the power line 112. The illustrated power supply system 100 also includes a redundant power supply unit 114 having a second input 116 coupled to the AC power source 106 and a second output 118 coupled to the power line 112. The power supply system 100 also includes a switching module 119. The switching module 119 is configured to detect an electrical state of the power line 112, and based upon the detected electrical state, either couple the redundant power supply unit 114 to the power line 112 for providing backup power (also referred to as redundant power) to the external device 110 or decouple the redundant power supply unit 114 from the power line 112. In accordance with disclosed embodiments, the system also includes an enclosure 120, for example, a cabinet, a frame or a housing. Embodiments in accordance with the present disclosure are described below with reference to a cabinet 120; however embodiments of the present disclosure are not limited to enclosures that are a cabinet. The enclosure 120 is configured to support and in some embodiments enclose the power supply module 102, the switching module 119 and the redundant power supply unit 114.

According to an embodiment of the present disclosure, the power supply module 102 includes an AC/DC converter 122. The AC/DC converter 122 is configured to convert a 220V AC signal received at the first input 104 from the AC power source 106 to a 24V DC signal as measured at the first output 108 of the power supply module 102. However, the scope of the present disclosure covers AC/DC converters adapted to convert either a 110V AC signal or a 220V AC signal to 12V or 24V DC signals, as well as stepping the AC signal down to any DC voltage or DC current. The AC/DC converter 122 may include one or more of components, including components such as transformers, full waver rectifiers, smoothing capacitors, and voltage regulators. AC/DC converters are well known in the art and will not be discussed in more detail.

In another embodiment of the present disclosure, the power supply module 102 is a power supply board 102 configured for mounting the AC/DC converter 122, as well as any circuitry used in conjunction with AC/DC converters. Power supply boards include circuit boards and may have metal lines, connectors, and other electrical components, such as resistors, capacitors, inductors and transistors, formed as integrated circuits and/or as discrete components.

In yet another embodiment according to the present disclosure, the power supply module 102 may optionally include the switching module 119. For example, the AC/DC converter 122 and the switching module 119 may be mounted to the power supply board 102.

Figure 2:
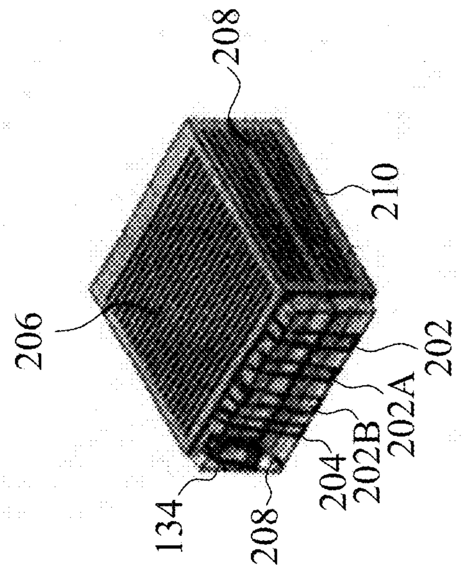
FIG. 2 illustrates an enclosure of the power supply system of FIG. 1, according to an embodiment of the present disclosure.

FIG. 2 illustrates a cabinet 120, according to an embodiment of the present disclosure. The cabinet 120 includes a slot 202 for receiving the power supply module 102. In one embodiment, the cabinet 120 is configured for receiving the power supply board 102. In accordance with one embodiment of the present disclosure, the slot 202 and the power supply board 102 are configured with respective electrical contacts (not shown) and respective locking tabs (not shown) such that when the power supply board 102 is slid into the slot 202, the respective tabs engage one another for locking the power supply board 102 in place, and the respective electrical contacts engage one another for electrically connecting the power supply board 102 with electrical components of the power supply system 100, such as the power line 112 and/or the switching module 119.

The power supply board 102 may also be easily removed from the power supply system 100 by disengaging the respective locking tabs and pulling the power supply board 102 out of the slot 202. In one embodiment, an operator may, for example, push, pull and/or turn a locking tab for disengaging and/or engaging the tabs with one another. However, the scope of the present disclosure also covers securing the power supply board 102 in place in the slot 202 via screws, clamps, bars, or by other mechanically removable bindings.

Referring again to FIG. 1, and in accordance with another embodiment of the present disclosure, the redundant power supply unit 114 includes a redundant power supply module 124 coupled between the second input 116 of the redundant power supply unit 114 and the second output 118 of the redundant power supply unit 114. In accordance with embodiments of the present disclosure, redundant power supply unit 114 further includes a backup power source 126 coupled to the second output 118 of the redundant power supply unit 114. In one embodiment, the redundant power supply module 124 is configured to charge the backup power source 126. For example, in one embodiment the redundant power supply module 124 is configured to charge the backup power source 126 when the redundant power supply unit 114 is decoupled, by the switching module 119, from the power line 112. In accordance with embodiments of the present disclosure, redundant power supply unit is electrically connected and powered by a power transformer for the external device 110.

According to an embodiment of the present disclosure, the redundant power supply module 124 includes an AC/DC converter 125 (also referred to as a redundant AC/DC converter) configured to convert the 220V AC signal received at the second input 116 of the redundant power supply unit 114 to a 24V DC signal as measured at the second output 118 of the redundant power supply unit 114. The AC/DC converter 125 may be identical to the AC/DC converter 122 of the power supply module 102 or it may be different. The scope of the present disclosure covers AC/DC converters adapted to convert either a 110V AC signal or a 220V AC signal to 12V or 24V DC signals, as well as stepping the AC signal down to any DC voltage or DC current. The AC/DC converter 125 may include one or more of components, including components such as transformers, full waver rectifiers, smoothing capacitors, and voltage regulators.

According to another embodiment of the present disclosure, the redundant power supply module 124 is a power supply board 124 (also referred to as a redundant power supply board 124) configured for mounting the redundant AC/DC converter 125, as well as any circuitry used in conjunction with AC/DC converters. Referring again to FIG. 2, the cabinet 120 includes a slot 204 for receiving the redundant power supply module 124. In one embodiment, the cabinet 120 is configured for receiving the redundant power supply board 124. The slot 204 and the redundant power supply board 124 are configured with respective electrical contacts (not shown) and respective locking tabs (not shown) such that when the redundant power supply board 124 is slid into the slot 204, the respective tabs engage one another for locking the redundant power supply board 124 in place, and the respective electrical contacts engage one another for electrically connecting the redundant power supply board 124 with electrical components of the power supply system 100, such as the backup power source 126 and/or the switching module 119.

The redundant power supply board 124 may also be easily removed from the power supply system 100 by disengaging the respective locking tabs and pulling the redundant power supply board 124 out of the slot 204. In one embodiment, an operator may, for example, push, pull and/or turn a locking tab for disengaging and/or engaging the tabs with one another. However, the scope of the present disclosure also covers securing the redundant power supply board 124 in place in the slot 204 via screws, clamps, bars, or by other mechanically removable bindings.

In yet another embodiment of the present disclosure, the redundant power supply unit 114 is configured as a redundant power supply board to which the redundant power supply module 124, the backup power source 126, and optionally the switching module 119 are electrically mounted. In this embodiment, the slot 204 of the cabinet 120 is configured for receiving the redundant power supply board. The slot 204 and the redundant power supply board may be configured with respective electrical contacts (not shown) and respective locking tabs (not shown) such that when the redundant power supply board is slid into the slot 204, the respective tabs engage one another for locking the redundant power supply board in place, and the respective electrical contacts engage one another for electrical connecting the redundant power supply board with other electrical components of the power supply system 100, such as the switching module 119 or the power line 112.

Referring again to FIG. 1, and in a further embodiment of the present disclosure, the backup power source 126 has a first node 130 and a second node 132. The first node 130 of the backup power source 126 is coupled to the second output 118 of the redundant power supply unit 114 and the second node 132 of the backup power source 126 is coupled to ground (e.g., a ground for the power supply system 100).

In one embodiment of the present disclosure, the backup power source 126 is a power capacitor 126. The power capacitor 126 may be any capacitor configured to 25 volts or greater. In another embodiment of the present disclosure, the backup power source 126 is a battery configured to 25 volts or greater. In one embodiment, a first plate (not shown) of the power capacitor 126 (or battery) is coupled to the first node 130, and a second plate (not shown) of the power capacitor 126 (or battery) is coupled to the second node 132 (i.e., coupled to ground). Embodiments in accordance with the present disclosure are not limited to power capacitors and batteries that store 25 volts or greater. Power capacitors or batteries that are not capable of storing 25 volts or more are included in embodiments described herein, e.g., power capacitors or batteries that are only able to store less than 25 volts.

The switching module 119 is configured to detect the electrical state of the power line 112 and couple/decouple the redundant power supply unit 114 to/from the power line 112 based upon the detected electrical state. According to one embodiment of the present disclosure, the electrical state is a voltage on the power line 112, a current on the power line 112 and/or power on the power line 112. The electrical state may also include a resistance of the power line 112 for determining, for example, if the power line 112 has been shorted to ground or if the power line 112 is an open circuit.

In one embodiment, the switching module 119 includes a switch 121 configured to close, or remain closed, when the switching module 119 detects that the voltage on the power line 112 is less than a predefined minimum voltage threshold or greater than a predefined maximum voltage threshold, or the current on the power line 112 is less than a predefined minimum current threshold or greater than a predefined maximum current threshold, and/or the power on the power line 112 (e.g., power being delivered over the power line 112 to the external device 110) is less than a predefined minimum power threshold or greater than a predefined maximum power threshold. When one of the above-defined electrical states of the power line 112 is detected, the power supply module 102 is providing the external device 110 with either insufficient power, voltage and/or current or too much power, voltage and/or current for proper operation of the external device 110. When the switch 121 is closed, the power backup source 126 is connected to the external device 110 via the power line 112, and the power backup source 126 provides sufficient power (also referred to as redundant power) and/or voltage and/or current to the external device 110. The power supply system 100 thus provides the external device 110 an uninterrupted supply of in-spec operating power, voltage and/or current, independent upon whether the power supply module 102 is failing, has failed, or is operating in a substandard manner.

Although not illustrated, the switching module 119 may include integrated circuits and/or discrete components, such as resistors, capacitors and inductors configured for measuring voltages, currents and/or power on the power line 112. Circuits for measuring voltages, currents and power on electrical lines are well known in the art and will not be discussed in more detail.

In another embodiment of the present disclosure, the switch 121 is configured to open or remain open when the switching module 119 detects that the voltage on the power line 112 is greater than or equal to the predefined minimum voltage threshold and less than or equal to the predefined maximum voltage threshold, the current on the power line 112 is greater than or equal to the predefined minimum current threshold and less than or equal to the predefined maximum current threshold, and/or the power on the power line 112 is greater than or equal to the predefined minimum power threshold and less than or equal to the predefined maximum power threshold. The external device 110 is disconnected from the backup power source 126 when the switch 121 is in an open state. By disconnecting the backup power source 126 from the external device 110, the backup power source 126 can be effectively recharged by the redundant power supply module 124.

In another embodiment of the present disclosure, the enclosure 120 is a cabinet configured as a heat sink for the power supply module 102, the redundant power supply unit 114 and/or the switching module 119. Referring again to FIG. 2, and according to an embodiment of the present disclosure, cabinet 120 includes a top portion 206, a side portion 208 and a bottom portion 210, or any combination of the top portion 206, side portion 208 and bottom portion 210. According to one embodiment, the top portion 206, the side potion 208 and/or the bottom portion 210, or any combination of the top portion 206, the side portion 208 and the bottom portion 210, are configured as heat sinks for the power supply module 102, the redundant power supply unit 114 and/or the switching module 119. For example, any of the top, side and bottom portions 206, 208, 210 of cabinet 120 may be formed of a metal, such as a metal having a relatively high thermal conductivity, may have corrugated surfaces and/or may have slotted openings for conducting heat from the interior of the cabinet 120 to outside the cabinet 120 and to the environment around the cabinet. In accordance with other embodiments, enclosure 120 can be a frame or housing which does not include a top, side and/or bottom portion. In accordance with such alternative embodiments, enclosure 120 is open at one or more of its top, side and/or bottom sides. In such alternative embodiments, enclosure 120 includes thermally conductive structures, such as thermally conductive fins, designed to dissipate thermal energy to an environment around such thermally conductive structure. The enclosure 120 includes a thermal energy pathway along which thermal energy from the power supply module 102, redundant power supply unit 114 and/or the switching module 119 is transmitted to the thermally conductive structures.

Furthermore, although not illustrated, heat conducting strips may connect portions of the top, side and/or bottom portions 206, 208, 210 of the cabinet 120 with portions of the power supply module 102, the redundant power supply unit 114 and/or the switching module 119, such as portions of the power supply board 102 and the redundant power supply board 114. Alternatively, the power supply board 102, the redundant power supply board 114, and the slots 202, 204 can be configured such that contact between the boards 102, 114 (e.g., edges (not shown) of the boards 102, 114) and the top, side, and/or bottom portions 206, 208, 210 of the cabinet 120 occurs when the boards 102, 114 are inserted into the respective slots 202, 204, thereby enabling heat transfer from the boards 102, 114 to the top, side and/or bottom portions 206, 208, 210 of the cabinet 120.

According to another embodiment of the present disclosure, the power supply system 100 may include an electrical monitoring device 134 having a display 136, as illustrated by FIGS. 1 and 2. The electrical monitoring device 134 may be attached to the cabinet 120, for example attached to a side portion 208 of the cabinet such that the electrical monitoring device 134 is not contained within the cabinet 120. The electrical monitoring device 134 may be coupled to the power supply module 102 and optionally to the redundant power supply unit 114. The electrical monitoring device 134 is configured to detect the electrical state of the power supply module 102 and the redundant power supply unit 114 and display the electrical states of the power supply module 102 and the redundant power supply unit 114 on the display 136. For example, the electrical states of the power supply module 102 and the redundant power supply unit 114 may include any interior voltage, current or power measured with respect to any components or lines connecting components that compose the power supply module 102 and the redundant power supply unit 114, such as transformers, rectifiers, capacitors, voltage regulators, and optionally the backup power source 126 and/or switching module 119. Although not illustrated, the electrical monitoring device 134 may include integrated circuits and/or discrete components, such as resistors, capacitors, inductors configured for measuring voltages, currents and/or power of circuit components of electrical systems.

In addition to detecting the electrical state of the power supply module 102 and optionally the redundant power supply unit 114, the electrical monitoring device 134 may be configured to generate alert messages for display by the display 136 and/or audio alert messages sent to speakers (not shown), based upon the detected electrical state. Thus, a system operator may be alerted that a power supply module is performing insufficiently, is failing or has failed. The operator may then replace the faulty power supply module, e.g., the power supply module 102, with a new power supply module. The failure or insufficient performance of a power supply module, as well as the replacement thereof, may be performed without any interruption of power to the external device 110, since the power will be supplied to the external device 110 by the backup power source 126 of the redundant power supply unit 114 until a new power supply module is installed and providing adequate (i.e., in-spec) power to the external device 110 via the power line 112 as detected by the switching module 119.

Alternatively, or in addition, the electrical monitoring device 134 may be coupled to the power line 112 and/or the switching module 119. In this embodiment, the electrical monitoring device 134 is additionally configured to detect the electrical state of the power line 112 and/or the switching module 119 and display the electrical state(s) of the power line 112 and/or the switching module 119 on the display 136. For example, the electrical state of the power line 112 may be a voltage on the power line 112, a current on the power line 112 and/or power on the power line 112. The electrical state may also include a resistance of the power line 112 for determining, for example, if the power line 112 has been shorted to ground or if the power line 112 is an open circuit. In addition to detecting the electrical state of the power line 112 and/or the switching module 119 and displaying the electrical state on the display 136, the electrical monitoring device 134 may be configured to generate alert messages for display on the display 136, or audio alert messages sent to speakers (not shown), based upon the detected electrical state of the power line 112 and/or the switching module 119.

In another embodiment of the present disclosure, and as illustrated by FIG. 1, the cabinet 120 is configured to be physically separated from the external device 110. For example, in the illustrated embodiment, the minimum distance between the cabinet 120 and the external device is indicated by a distance d. By containing components of one or more of the power supply module 102 and/or redundant power supply unit 114 in a cabinet 120 spaced from the external device 110 being powered, thermal energy generated by components of one or more of the power supply module 102 and optionally the redundant power supply unit 114 is readily removed from such components and more readily dissipated to the environment. Doing so reduces the risk of any of the components enclosed by the cabinet 120 will be exposed to temperatures that will result in overheating of the components which could result in failure of such components. The distance d will depend upon the type of external device 110 and the amount of thermal energy generated by operation of the external device 110 and the components of power supply module 102 and optionally the redundant power supply unit 114, as well as the ambient temperature of the surrounding environment in which the cabinet 120 is placed, and the power being generated by the power supply board 102, the redundant power supply unit 114 and the switching module 119 of the cabinet 120. Examples of suitable distances d vary over a wide range, e.g., over 1 meter, over 2 meters, over 3 meters or over 5 meters. Embodiments of the present disclosure are not limited to the foregoing values for d. D can be a distance that falls outside the foregoing ranges.

In one embodiment according to the present disclosure, the external device 110 is a powered component of a semiconductor processing system, such as a deposition chamber, an ion bombardment chamber or an etching chamber/tank. The semiconductor processing system may be used in the fabrication of integrated circuits on semiconductor wafers. However, embodiments of the present disclosure can be implemented in any DC powered system in which the minimization of the risk of power failure, the delivery of uninterrupted power, and the control of heat dissipation is important.

In yet another embodiment according to the present disclosure, and as illustrated by FIG. 1, the power supply system 100 includes a plurality of power supply modules, including the optional power supply modules 102A, 102B. Although FIG. 1 illustrates three power supply modules 102, 102A, 102B, the scope of the present disclosure includes more than 3 power supply modules. Each of the power supply module 102A, 102B has a first input 104A, 104B coupled to the AC power source 106 and a first output 108A, 108B coupled to a corresponding external device 110A, 110B via a corresponding power line 112A, 112B. Each power supply module 102A, 102B is configured to provide power to the corresponding device 110A, 110B via the corresponding power line 112A, 112B. The power supply system 100 may also include a plurality of switching modules, including the optional switching modules 119A, 119B. In one embodiment of the present disclosure, the switching module 119A include a switch 121A, and the switching module 119B includes a switch 121B. Each switching module 119A, 119B is coupled to a corresponding power line 112A, 112B. The second output 118 of the redundant power supply unit 114 is coupled to each of the switching module 119A, 119B. Each of the switching module 119A, 119B is configured to detect an electrical state of the corresponding power line 112A, 112B and connect the redundant power supply unit 114 to the corresponding power line 112A, 112B for providing redundant power (i.e., backup power) to the corresponding external device 110A, 110B based upon the detected electrical state. The cabinet 120 is configured to enclose the plurality of power supply modules 102, 102A, 102B, the plurality of corresponding switching modules 119, 119A, 119B and the redundant power supply unit 114. As illustrated by FIG. 2, the slots 202A, 202B may be configured to receive the power supply modules 102A, 102B, respectively.

Although FIGS. 1 and 2 illustrate only one electrical monitoring device 134, the scope of the present disclosure includes embodiments having a plurality of electrical monitoring devices 134, where each electrical monitoring device 134 is coupled to a corresponding power supply 102, and one monitoring device 134 may be coupled to the redundant power supply unit 114. Thus, if the system includes n power supply modules 102 and one redundant power supply unit 114, then the system may include n+1 electrical monitoring devices 134.

Figure 3:
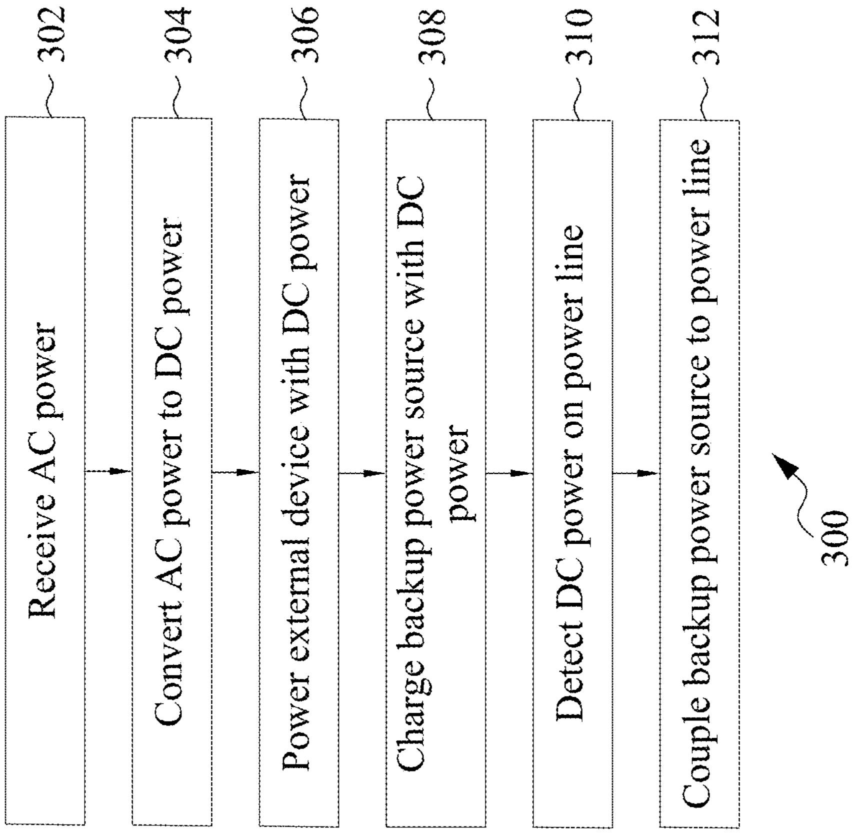
FIG. 3 illustrates a flowchart of a method for providing redundant power to an external device, according to an embodiment of the present disclosure.

FIG. 3 illustrates a flowchart of a method 300 for providing uninterrupted power to an external device, according to an embodiment of the present disclosure. In step 302, AC power is received from an external AC power source. For example, a power supply module 102 and a redundant power supply unit 114 may receive an AC signal, such as a 220V AC signal from an external AC power source 106.

In step 304, the received AC power is converted to DC power. For example, both the power supply module 102 and the redundant power supply unit 114 may convert a received AC signal, such as a 220V AC signal, to a DC signal, such as a 24V DC signal. However, the scope of the present disclosure covers converting any AC signal to any DC signal.

In step 306, an external device is powered with the DC power. For example, the power supply module may provide DC power for powering the external device over a power line.

In step 308, a backup power source is charged with the DC power. For example, the redundant power supply unit charges the backup power source with the DC power. In one embodiment according to the present disclosure, the backup power source is charged by the redundant power supply unit while the backup power source is uncoupled from the power line.

In step 310, DC power is detected on the power line. For example, a switching module includes circuitry configured to detect power, voltage and/or current on the power line.

In step 312, the backup power source is coupled to the power line for powering the external device based on the detected DC power. For example, the switching module may include a switch configured to close for coupling the backup power source to the power line for powering the external device based on the detected DC power. In one embodiment, the backup power source is coupled to the power line when the detected DC power is below a predefined minimum DC power threshold or above a predefined maximum DC power threshold. In another embodiment, the backup power source may be decoupled from the power line when the detected DC power is greater than or equal to the predefined minimum DC power threshold and less than or equal to the predefined maximum DC power threshold. In yet another embodiment according to the present disclosure, the backup power source is a power capacitor or a battery. In one embodiment, the power capacitor or the battery is configured to be charged to at least 25V.

The present disclosure provides a power system and method for providing uninterrupted power to an external device(s), as well as reducing the risk of a power failure by the power system due to overheating of the power system by providing a heat sink for the power system and/or physically separating the power system from external devices powered by the power system so as to control the dissipation of heat produced by the power system and mitigate the effect of heat generated by the external devices on the power system. In the event of a power failure or substandard output, the power system and method of the present disclosure provides uninterrupted delivery of backup power to the external devices until the subsystem(s) providing the failed power can be replaced. The power system and method of the present disclosure provides uninterrupted delivery of power at the time of power failure and during the replacement of the failed power supply subsystem with a new power supply subsystem. Furthermore, the power system and method of the present disclosure provides for monitoring components of the system and for efficient replacement of faulty components detected by the monitoring.

In one embodiment, a power supply system includes a power supply module having a first input coupled to an AC power source and a first output coupled to an external device via a power line. The power supply module is configured to provide power to the external device via the power line. The power supply system may further include a switching module coupled to the power line and a redundant power supply unit having a second input coupled to the AC power source and a second output coupled to the switching module. The switching module is configured to detect an electrical state of the power line and connect the redundant power supply unit to the power line for providing redundant power to the external device based upon the detected electrical state. The power supply system may further include a cabinet. The cabinet is configured to enclose the power supply module, the switching module and the redundant power supply unit.

In another embodiment, a power supply system includes a plurality of power supply modules. Each power supply module has a first input coupled to an AC power source and a first output coupled to a corresponding external device via a corresponding power line. Each power supply module is configured to provide power to the corresponding external device via the corresponding power line. The power supply system may further include a plurality of corresponding switching modules. Each corresponding switching module is coupled to the corresponding power line. The power supply system may further include a redundant power supply unit having a second input coupled to the AC power source and a second output coupled to each corresponding switching module. Each corresponding switching module is configured to detect an electrical state of the corresponding power line and connect the redundant power supply unit to the corresponding power line for providing redundant power to the corresponding external device based upon the detected electrical state. The power supply system may further include a cabinet. The cabinet is configured to enclose the plurality of power supply modules, the plurality of corresponding switching modules and the redundant power supply unit.

In a further embodiment, a method for providing uninterrupted power to an external device includes receiving AC power from an external AC power source, converting the received AC power to DC power, powering the external device with the DC power via a power line, charging a backup power source with the DC power while the backup power source is uncoupled from the power line, detecting the DC power on the power line, and coupling the backup power source to the power line for powering the external device based on the detected DC power.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein.

Those skilled in the art should also realize that such equivalent constructions do not depart from the spirit and scope of the present disclosure, and that they may make various changes, substitutions, and alterations herein without departing from the spirit and scope of the present disclosure.

The invention claimed is:

1. A power supply system for a powered semiconductor processing system, the power supply system comprising:

a plurality of power supply modules, each configured to couple to an AC power source and to provide power to the powered semiconductor processing system;

a plurality of switching modules, each switching module coupled to one of the plurality of power supply modules and configured to detect an electrical state of the respective power supply module to which the switching module is coupled;

a redundant power supply unit coupled to the AC power source and configured to connect to the plurality of switching modules based upon the detected electrical state; and an enclosure configured as a heat sink for the plurality of power supply modules, the plurality of switching modules, and the redundant power supply unit, wherein the enclosure is physically separated from the powered semiconductor processing system by a predetermined distance to mitigate thermal impact on the plurality of power supply modules, the plurality of switching modules, and the redundant power supply unit from the powered semiconductor processing system and to facilitate heat dissipation, the predetermined distance being selected based at least in part on one or more of: a type of the powered semiconductor processing system, a thermal output of the powered semiconductor processing system, a thermal output of the power supply system, or an ambient temperature of a surrounding environment in which the enclosure is placed.

2. The power supply system of claim 1, wherein each of the plurality of power supply modules comprises an AC/DC converter configured to convert a 220V AC signal to a 24V DC signal.

3. The power supply system of claim 2, wherein each of the plurality of power supply modules comprises a power supply board configured for mounting the AC/DC converter, and wherein the enclosure includes a slot for removably receiving the power supply board.

4. The power supply system of claim 1, wherein the redundant power supply unit comprises:

a redundant power supply module coupled between an input of the redundant power supply unit and an output of the redundant power supply unit; and a backup power source coupled to the output of the redundant power supply unit, the redundant power supply module configured to charge the backup power source, and wherein a switch of the respective switching module is configured to close for providing redundant power to the powered semiconductor processing system based upon the detected electrical state of the power line.

5. The power supply system of claim 4, wherein the redundant power supply module comprises a redundant AC/DC converter configured to convert a 220V AC signal to a 24V DC signal.

6. The power supply system of claim 5, wherein the redundant power supply module comprises a redundant power supply board configured for mounting the redundant AC/DC converter, wherein the enclosure includes a redundant slot for removably receiving the redundant power supply board, and wherein the redundant power supply board inside the redundant slot is capable of supporting heat transfer from the redundant power supply board to the enclosure.

7. The power supply system of claim 4, wherein the backup power source is a power capacitor, and wherein the power capacitor is configured to store at least 25 volts.

8. The power supply system of claim 7, wherein the power capacitor has a first node and a second node, wherein the first node is coupled to the redundant power supply unit and the second node is coupled to ground.

9. The power supply system of claim 4, wherein the electrical state is one or more of: a voltage on the power line, a current on the power line and the power on the power line, and wherein the switch is configured to close when at least one of: the voltage is less than a predefined minimum voltage threshold or greater than a predefined maximum voltage threshold, the current is less than a predefined minimum current threshold or greater than a predefined maximum current threshold, and the power is less than a predefined minimum power threshold or greater than a predefined maximum power threshold.

10. The power supply system of claim 9, wherein the switch is configured to open when at least one of: the voltage is greater than or equal to the predefined minimum voltage threshold and less than or equal to the predefined maximum voltage threshold, the current is greater than or equal to the predefined minimum current threshold and less than or equal to the predefined maximum current threshold, and the power is greater than or equal to the predefined minimum power threshold and less than or equal to the predefined maximum power threshold.

11. The power supply system of claim 1, wherein the enclosure is a cabinet, and wherein the cabinet includes thermally conductive structures and a thermal energy pathway configured to transmit thermal energy from the power supply module, the switching module, and the redundant power supply unit to the thermally conductive structure.

12. The power supply system of claim 1, further comprising an electrical monitoring device having a display, the electrical monitoring device attached to the enclosure and coupled to at least one of the plurality of power supply modules, the electrical monitoring device configured to detect an electrical state of the at least one of the plurality of power supply modules and display the electrical state of the at least one of the plurality of power supply modules on the display.

13. The power supply system of claim 12, wherein the at least one of the plurality of power supply module comprises an AC/DC converter having AC/DC converter electrical components, and the electrical state of the at least one of the plurality of power supply modules is one of: a voltage of any of the AC/DC converter electrical components, a current of any of the AC/DC converter electrical components, and a power of any of the AC/DC converter electrical components.

14. The power supply system of claim 1, wherein the powered semiconductor processing system comprises a plasma processing chamber, a chemical vapor deposition chamber, a physical vapor deposition chamber, an ion implantation chamber, or a photolithographic chamber.

15. The power supply of claim 1, wherein the at least one of the plurality of power supply modules is configured to provide DC power to the powered semiconductor processing system, wherein the redundant power supply unit is configured to provide redundant DC power to the powered semiconductor processing system.

16. A power supply system for a powered semiconductor processing system, the power supply system comprising:

a plurality of power supply modules, each power supply module configured to couple to an AC power source and to provide power to the powered semiconductor processing system;

a plurality of switching modules, each switching module corresponding to one of the plurality of power supply modules, and each switching module configured to detect an electrical state of a power line of a respective power supply module and including a switch coupled to the respective power line;

a redundant power supply unit coupled to the AC power source and configured to connect to the plurality of switching modules based upon the detected electrical state; and an enclosure configured to receive the plurality of power supply modules, the plurality of switching modules, and the redundant power supply unit, wherein the enclosure is physically separated from the powered semiconductor processing system by a predetermined distance to mitigate thermal impact on the plurality of power supply modules, the plurality of switching modules, and the redundant power supply unit from the powered semiconductor processing system and to facilitate heat dissipation, the predetermined distance being selected based at least in part on one or more of: a type of the powered semiconductor processing system, a thermal output of the powered semiconductor processing system, a thermal output of the power supply system, or an ambient temperature of a surrounding environment in which the enclosure is placed.

17. A method for providing uninterrupted power to a powered semiconductor processing system, comprising:

receiving AC power from an external AC power source;

converting the received AC power to DC power by one of a plurality of power supply modules contained in an enclosure that is configured as a heat sink and is external to the powered semiconductor processing system;

providing the DC power to the powered semiconductor processing system via a power line coupled to the one of the plurality of power supply modules;

including a plurality of switching modules, each switching module coupled to one of the plurality of power supply modules and configured to detect an electrical state of a respective power line, each switching module including a switch coupled to the respective power line;

converting the received AC power to DC power by a redundant power supply unit contained in the enclosure and coupled to the plurality of switching modules;

detecting the DC power on the respective power line by one of the plurality of switching modules, each switching module configured to connect the redundant power supply unit to the respective power line by changing a state of the switch based upon the detected state; and coupling the redundant power supply to the respective power line for powering the powered semiconductor processing system based on the detected DC power, wherein the enclosure is physically separated from the powered semiconductor processing system by a predetermined distance to mitigate thermal impact on the plurality of power supply modules, the plurality of switching modules, and the redundant power supply unit from the powered semiconductor processing system and to facilitate heat dissipation, the predetermined distance being selected based at least in part on one or more of: a type of the powered semiconductor processing system, a thermal output of the powered semiconductor processing system, a thermal output of the power supply system, or an ambient temperature of a surrounding environment in which the enclosure is placed.

18. The method of claim 17, further comprising charging a backup power source with the DC power and coupling the backup power source to the power line when the detected DC power is below a predefined minimum DC power threshold or above a predefined maximum DC power threshold.

19. The method of claim 18, further comprising decoupling the backup power source from the power line when the detected DC power is greater than or equal to the predefined minimum DC power threshold and less than or equal to the predefined maximum DC power threshold.

20. The method of claim 18, wherein the external AC power source comprises a 220V external AC power source, wherein converting the received AC power to DC power comprises converting a 220V AC signal to a 24V DC signal, and wherein the backup power source is a power capacitor, the power capacitor configured to be charged to at least 25V.

* * * * *